(12) United States Patent
Wadsworth et al.

(10) Patent No.: US 6,446,666 B1
(45) Date of Patent: Sep. 10, 2002

(54) VALVE LOCK AND ADAPTER

(75) Inventors: Martin James Wadsworth, Atherton; Stephen Leslie Foster, Blackburn, both of (GB)

(73) Assignee: EJA Limited, Wigan (GB)

( * ) Notice: Subject to any disclaimer, the term of this patent is extended or adjusted under 35 U.S.C. 154(b) by 0 days.

(21) Appl. No.: 09/730,874

(22) Filed: Feb. 21, 2001

Related U.S. Application Data (63) Continuation of application No. 09/381,772, filed as application No. PCT/GB98/00877 on Mar. 23, 1998, now Pat. No. 6,213,148.

(51) Int. Cl.$^7$ .............................................. F16K 37/00
(52) U.S. Cl. ....................... 137/556; 137/552; 251/292
(58) Field of Search ................................ 137/556, 552; 251/292

(56) References Cited

U.S. PATENT DOCUMENTS

| | | | |
|---|---|---|---|
| 753,330 A | * 3/1904 | Thielenhaus et al. | 137/552 |
| 3,701,362 A | 10/1972 | Reese | 137/556.3 |
| 3,869,888 A | 3/1975 | Yoshizawa | 70/355 |
| 4,471,801 A | 9/1984 | Lange | 137/385 |
| 4,723,569 A | 2/1988 | Ellis | 137/385 |
| 4,961,443 A | 10/1990 | Buccicone et al. | 137/359 |
| 5,564,461 A | * 10/1996 | Raymond, Jr. et al. | 251/292 |
| 6,213,148 B1 | * 4/2001 | Wadsworth et al. | 137/556 |

FOREIGN PATENT DOCUMENTS

| | | |
|---|---|---|
| GB | 2168131 | 6/1986 |

* cited by examiner

Primary Examiner—A. Michael Chambers
(74) Attorney, Agent, or Firm—Himanshu S. Amin; Alexander M. Gerasimow; William R. Walbrun

(57) ABSTRACT

A valve lock for locking a valve spindle in a selected position corresponding to the valve being for example fully open or fully closed. The lock has a housing which is mounted on the valve body and a hub which engages and rotates with the valve spindle relative to the housing. A latch is provided between the housing and the hub, the latch being actuatable by a key to assume a latched condition in which rotation of the hub relative to the housing is permitted in one direction but prevented in the other direction. A spindle position indicator is coupled by a transmission to the hub as to be displaced as a result of rotation of the spindle, thereby to indicate the spindle position relative to the valve body. The spindle position indicator prevents actuation of the latch by the key except when the spindle is in the selected position as represented by the spindle position indicator. The spindle position indicator is locked in the predetermined orientation corresponding to the selected spindle position when the latch has been actuated by the key. The transmission incorporates a slip clutch which enables rotation of the hub in one direction if the spindle position indicator is locked in the predetermined orientation and sufficient torque is applied to the spindle engaging member to cause the clutch to slip. As a result the selected position can be reset simply by locking the spindle position indicator and then rotating the hub to a reset position.

8 Claims, 5 Drawing Sheets

VALVE LOCK AND ADAPTER

CROSS REFERENCE TO RELATED APPLICATION

The present application is a continuation application of U.S. patent application Ser. No. 09/381,772, filed Sep. 22, 1999, now U.S. Pat. No. 6,213,148 and entitled Valve Lock and Adapter, which is 371 of PTC/GB98/00877 filed Mar. 23, 1998

The present invention relates to a valve lock for locking a valve spindle in a selected position relative to a valve body, and to an adapter for interengaging for example a valve lock assembly and a valve spindle.

Valve locks are required to provide a means for locking a rotatable valve spindle in a pre-determined position. For example, in industrial installations in which potentially hazardous fluids are pumped through process equipment it is often necessary to secure a series of valves in a particular configuration. Valves are locked both to prevent unauthorised operation and, where a series of valves are interlocked, to prevent the sequential operation of a series of valves in a potentially dangerous manner. In an interlocked system, there may be for example three valves which must be opened in a predetermined sequence. In such a system, it is known to provide a key on the first valve in the sequence which can only be removed once that valve has been opened, that key then being used to release a second valve to enable that second valve to be opened, and a further key mounted on the second valve then being released to enable the third valve to be opened. Such key-operated mechanisms are widely used in the process control industry, and one such mechanism is described in British patent specification number 2292207.

Where a valve lock has a captive key that can only be removed once the valve has been fully closed, the mechanism requires a valve spindle position indicating mechanism which prevents key removal until the valve spindle has been rotated to a pre-determined axial and rotational position. Su mechanisms are often referred to as "counters" as in effect it is necessary to pre-set the position of the spindle at which the key is to be released, to count rotations of the spindle away from that initial position, and then to count rotations of the spindle back to the initial position. Thus rotation of the valve spindle is tracked by the counting mechanism such that when the valve spindle is returned to its initial position the valve position counting mechanism indicates that this is the case and releases the key.

One problem with the valve position indicator systems of known valve locks is that of setting the "initial" position during first installation. The mechanisms are delivered with the counters engaged with the other parts of the mechanism. Once installed on a valve, the counters must be reset so as to correctly indicate valve spindle positions at which keys are to be released. Generally this is achieved by removing a casing cover and manually resetting counter components, for example by rotating sprockets using a tool such as a screwdriver. It is highly undesirable to have to rely upon such manual intervention in the normal operation of the mechanism.

Another problem with the valve position indicator systems of known valve locks is that once they have been set, during installation, they are very difficult to reset. This is a severe problem in circumstances where over time the valve spindle position corresponding to the valve being fully closed changes. Such changes often occur as the result of compression over time of valve seals. For example, in a new installation, when the valve is fully closed by applying an appropriate torque to a hand wheel actuator, the valve spindle rotates until resilient valve seals are compressed to an extent sufficient to resist that applied torque. Over time, as the valve seals age and are subjected to repeated compression and relaxation, the same applied torque could result in the valve spindle being turned several times beyond the initial "fully closed" position Thus if the locking mechanism is not reset, a valve which is locked in the "fully closed" condition may in fact be several turns away from being fully closed. Potentially dangerous leakage can therefore occur through a valve which is nominally fully closed.

In a conventional valve lock, the valve spindle is interengaged with a hub of the lock mechanism such that rotation of the hub is directly coupled to the spindle. In the known devices, this interengagement is achieved by fitting a customised body between the spindle and the hub, the body defining a bore the cross-section of which is machined to match the cross-section of the valve spindle and having an outer periphery defining two slots which receive mating ribs on the hub. Such an arrangement works perfectly satisfactorily but raises two problems. Firstly, the interengaging body has to be designed to fit a particular spindle cross-section and therefore the installer has to know in advance of installation the detailed geometry of the valve spindle. As a result a detailed specification of the valve structure has to be prepared for the installer and valve locks cannot be reliably fitted without such advance information. Secondly, given that it is often the case that the valve lock must be mounted in a pre-determined orientation on the valve body, and must be interengaged with the valve spindle once the valve has been fully closed, it is sometimes necessary to partially open the valve by rotating the spindle back from its fully closed position until the spindle is in a position in which it can be inserted in the bore in the interengaging body mounted in the hub. It would be highly advantageous if a device could be provided which would enable a fitter to install a valve lock on a valve spindle without prior knowledge of the spindle geometry and without significant constraint on the relative orientation of the spindle and the valve body when the interengagement is established.

It is an object of the present invention to obviate or mitigate one or more of the problems outlined above.

According to the present invention, there is provided a valve lock for locking a valve spindle in a selected position relative to a valve body, comprising a housing which in use is mounted on the valve body, a spindle engaging member which rotates with the valve spindle relative to the housing, a latch which is actuable by a key to assume a latched condition in which rotation of the spindle engaging member relative to the housing is permitted in one direction but prevented in the other direction, and a spindle position indicator coupled by a transmission to the spindle engaging member so as to be displaced as a result of rotation of the spindle, wherein the spindle position indicator prevents actuation of the latch by the key except when the spindle position indicator is in a predetermined orientation, the spindle position indicator is locked in the predetermined orientation when the latch has been actuated by the key, and the transmission incorporates a slip clutch which enables rotation of the spindle engaging member in the said one direction if the spindle position indicator is locked in the pre-determined orientation and sufficient torque is applied to the spindle engaging member, whereby the selected position can be reset.

With valve locks on a accordance with the invention, initial setting of the spindle position indicator upon installation can be readily achieved by locking the indicator and then relying upon the ratchet-like latch to enable movement of the spindle to a desired "set" position. Equally, if after prolonged use a user of such a valve lock turns the valve spindle to an extreme position and discovers that the valve lock is not operable in that extreme position, the valve can simply be rotated back to a position at which the lock can be operated, and then advanced again after the spindle position indicator has been locked in position. The spindle position indicator can then be released once the valve has reached its extreme position, the indicator thus having been reset automatically without physical intervention by the user other than a simple manipulation of the valve lock key and rotation of the valve spindle.

The term "slip clutch" is used herein to mean any mechanical device which can be incorporated in the transmission so as to normally faithfully transmit rotation of the spindle to displacement of the position indicator but which enables relative slippage between them when the position indicator is locked and a sufficient torque is applied to the spindle.

The transmission may comprise a first sprocket driven by formations supported on the spindle engaging member and a second sprocket in driving engagement with the spindle position indicator, the slip clutch being located between the first and second sprockets such that the first sprocket can rotate relative to the second if sufficient torque is applied. The second sprocket may comprise two sets of axially spaced teeth and the spindle position indicator may comprise two axially spaced coaxial sprockets meshing with respective sets of teeth, actuation of the latch being prevented unless both the first and second spindle position indicator sprockets are in Determined rotational positions, the number of teeth in the sets of teeth and the number of teeth in the first and second spindle position indicator sprockets being selected to prevent actuation of the latch at more than one position of the spindle.

Preferably the housing is provided with a viewing window through which portions of the coaxial sprockets are visible, one or more of the sprockets carrying a marker to indicate when the sprockets are in the pre-determined rotational positions. The first and second spindle position indicator sprockets may define slots which are aligned with key displaceable members only when the sprockets are in the predetermined relative positions, the slots when so aligned permitting rotation of the key displaceable members, and rotation of the key displaceable members also causing actuation of the latch. The key displaceable members may be mounted to extend radially from a shaft which extends between two flanges in which the slots are defined, the shaft being rotatable about its major axis by the key. The shaft may bear against the latch and be shaped such that rotation of the shaft to a position in which the key displaceable members are engaged in the slots actuates the latch. The shaft may support an indicator which is visible when the shaft is rotated to the position in which the key displaceable members are engaged in the slots.

The slip clutch preferably comprises first and second members, surfaces of which are biased together by a spring, the surfaces being non-planar such that relative movement between them requires relative displacement between the two members and compression of the spring. The two surfaces may define mating peaks and troughs.

Preferably two spindle position indicators and two latches are arranged such that one latch when actuated prevents rotation of the spindle engaging member in one direction and the other latch when actuated prevents rotation of the spindle engaging member in the other direction, each spindle position indicator being coupled to the spindle engaging member by a respective transmission incorporating a respective slip clutch. This enables the valve lock to be secured at two spindle positions.

Preferably the spindle engaging member supports an annular array of teeth and the or each latch comprises a pivotal lever which is biased to a first position in which it engages the teeth and is moveable by the key to a second position in which it is spaced from the teeth, the lever being arranged such that when in the first position rotation of the teeth in one direction is permitted but rotation in the opposite direction is prevented as a result of the lever jamming an engagement with the teeth. A latch override member is preferably provided which may be driven into the housing to move the latch to the second position, means being provided to retain the driven member within the housing to indicate that the latch has been overridden.

Preferably the spindle engaging member defines a socket uniform, non-circular cross-section in planes perpendicular to an axis about which the spindle is rotatable, and the plurality of plates are engaged between the socket and spindle, each plate defining a peripheral edge which is shaped to fit the socket cross-section in each of the plurality of rotational positions relative to the spindle axis, and each plate defining an opening having a straight edge positioned relative to the plate to abut a plane surface defined by the spindle.

The present invention also provides a valve spindle adapter assembly comprising a housing which in use is mounted on a valve body from which extends a spindle that is rotatable relative to the valve body about a predetermined axis, a hub mounted on the housing so as to be rotatable about the spindle axis, and means for inter-engaging the hub and the spindle such that the hub and spindle rotate together, the spindle extending into a socket defined by the hub, and the socket being of uniform non-circular cross-section in planes perpendicular to the spindle axis, wherein the means for inter-engaging the hub and spindle comprises a plurality of plates each defining a peripheral edge which is shaped to fit the socket cross-section in each of a plurality of rotational positions relative to the spindle axis. each plate defining an opening having a straight edge positioned to abut said one planar surface of the spindle.

With such an adapter, a limited number of different plates with identical peripheral dimensions but different opening dimensions may be supplied to enable a fitter to interengage a standard valve lock hub with a wide range of different valve spindle configurations.

An embodiment of the present invention will now be described, by way of example, with reference to the accompanying drawings, in which.

Figure 1:
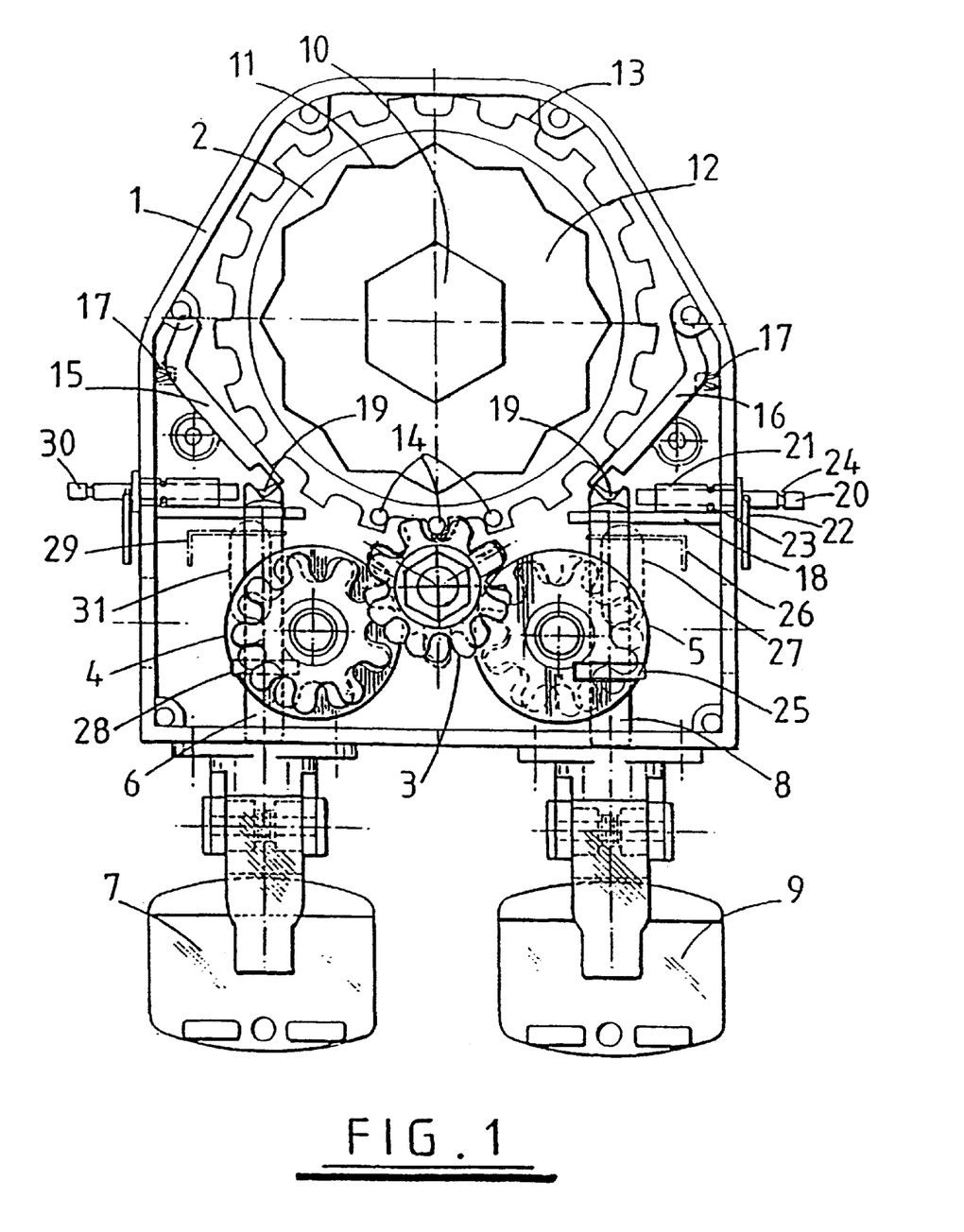
FIG. 1 is a plan view of the embodiment of the invention after removal of a housing cover.
Figure 2:
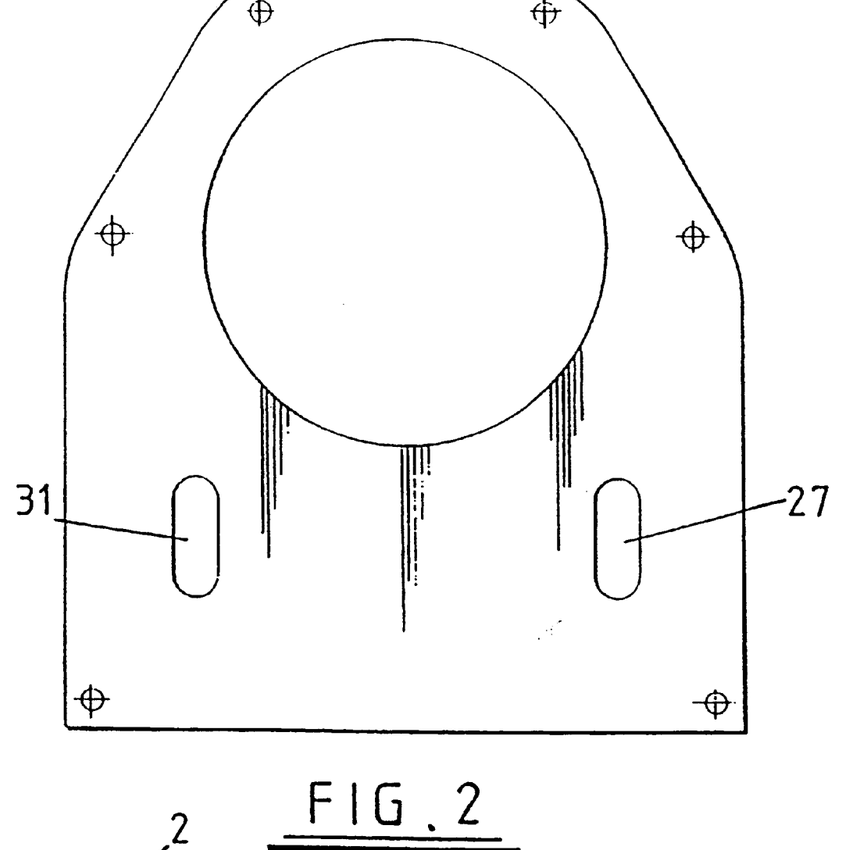
FIG. 2 is plan vie a housing cover which in use is mounted on the assembly as illustrated in FIG. 1.

Referring to FIG. 1, a valve lock in accordance with the present invention is shown after removal of a cover plate which is shown in FIG. 2. In use, the illustrated valve lock is clamped in any convenient manner to the body of a valve to be controlled (not shown) such that a spindle of the valve extends into and is engaged by the assembly. Only the spindle of the valve is shown in FIG. 1. The valve lock comprises a housing 1 which is clamped to the valve body, an annular valve spindle engaging member or hub 2, a transmission 3 which engages the hub 2 so as to be driven in rotation thereby, a first spindle position indicator 4 which is coupled to the transmission 3, and a second spindle position indicator 5 which is also coupled to the transmission 3. The indicator 4 interacts with a locking shaft 6 controlled by a key 7 and the indicator 5 interacts with a locking shaft 8 controlled by a key 9. The mechanism is arranged such that the valve spindle can be locked in either of two predetermined positions, one of which is determined by indicator 4 and the other of which is determined by indicator 5. The position determined by indicator 4 corresponds in the case of the illustrated valve lock to a position in which a valve spindle 10 engaged by the illustrated assembly has been turned as far as possible in a clockwise direction so as to close the valve. The position determined by indicator 5 corresponds to the opposite case, that is the valve spindle having been turned as far as possible in the anti-lockwise direction to the fully open condition.

The hub 2 has an axially uniform cross-section defining a surface 11 similar to that found inside a socket of the type used for rotating a nut Thus in cross-section the surface 11 defines twelve recesses. As described in detail below a space 12 is thus defined between the surface 11 and the spindle 10 into which plates may be inserted to interengage the spindle 10 and hub 2. Thus in the assembled condition, the spindle 10 and the hub 2 rotate together.

Figure 3:
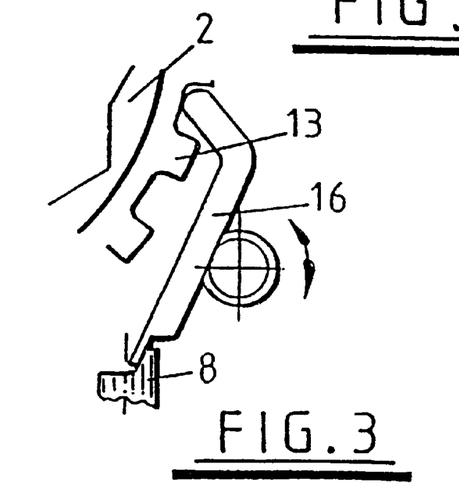
FIG. 3 shows a latch which is shown in FIG. 1 in an alternative position.

The outer surface of the hub 2 supports two axially spaced rings each defining twenty one teeth 13, the teeth of one ring being aligned with the teeth of the other. Three pins 14 extend across the axial gap between the two rings of teeth 13, the pins 14 driving the transmission 3. Latches 15 and 16 are biased by springs 17 into engagement with the outer surface of the hub so as to define two ratchet mechanisms with the teeth 13. In the position of the latches 15 and 16 shown in FIG. 1 the hub 2 is free to rotate in both directions. Each of the latches is pivotal from the positions shown in FIG. 1 into engagement with the adjacent teeth 13, FIG. 3 showing the position of the latch 16 after it has been so displaced. With the latch IS in the position shown in FIG. 1 and the latch 16 in the position shown in FIG. 3. the hub 2 could be rotated in the anti-lockwise direction but not in the clockwise direction. and vice-versa.

Figure 4:
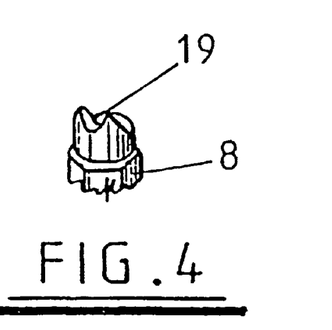
FIG. 4 illustrates the end of a key-actuated shaft which is incorporated in the embodiment of FIG. 1.
Figure 5:
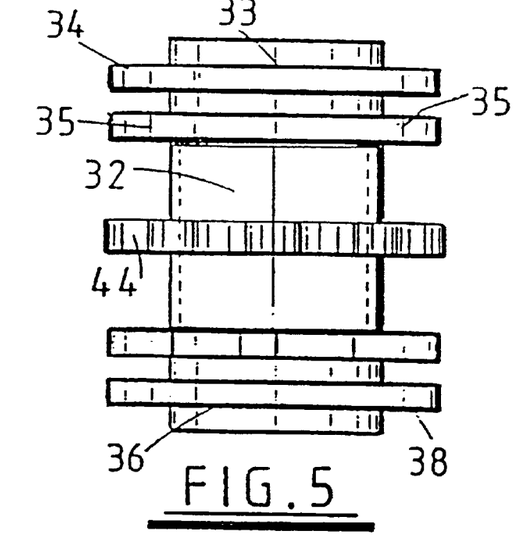
FIGS. 5 to 8 illustrate the detailed structure of a transmission component of the assembly shown in FIG. 1.
Figure 6:
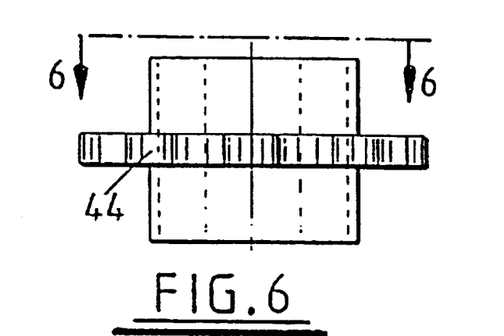
Figure 7:
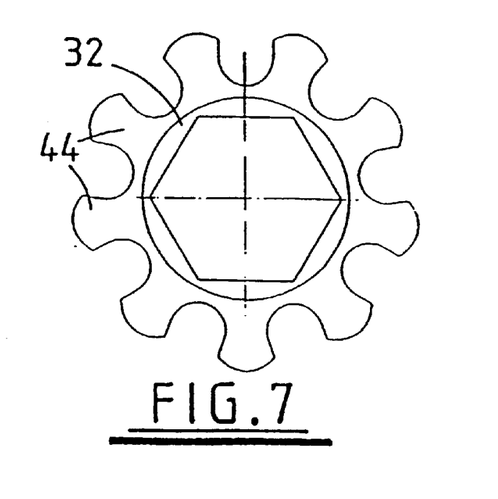
Figure 8:
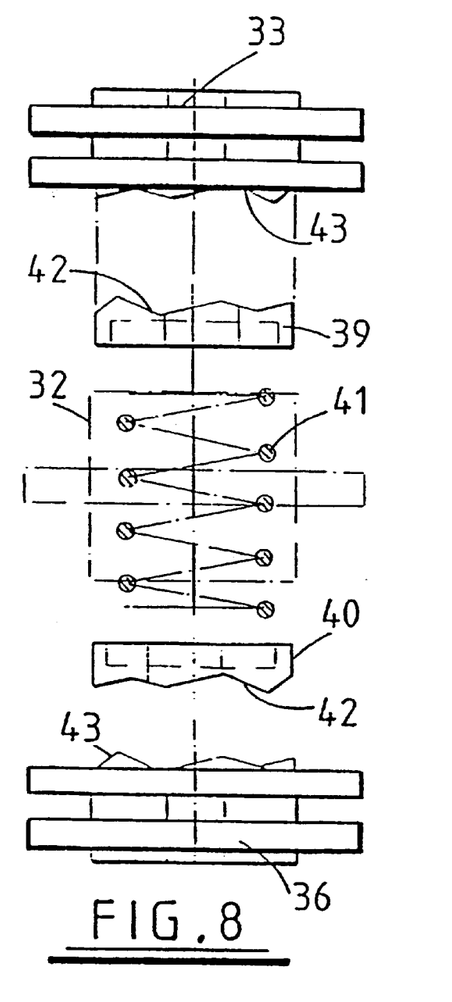

The end of the shaft 8 remote from the key 9 is supported in an upstanding plate 11 through which it projects into engagement with one end of the latch 16. Rotation of the shaft 8 through 90° C. about its major axis as a result of rotation of the key 9 enables the latch 16 to move between the positions shown for that component in FIGS. 1 and 3. It will be seen from FIGS. 1 and 4 that the end of the shaft 8 defines a recess 19 which, when the shaft 8 has been rotated to the position shown in FIG. 3, is aligned with a pin 20 mounted in a tube 21 supported on the housing 1. Thus if the shaft 8 and latch 16 are in the position shown in FIG. 3, the latch can be displaced to the position shown in FIG. 1 by driving the pin 20 into the housing. Thus, in an emergency a locked open valve can be released by driving in the pin 20 to override the locking mechanism. An indicator device 22 is mounted on the pin 20 so as to be snapped off when the pin is driven in, thereby making it possible to see when the pin 20 has been displaced. In addition, a clip 23 is retained in slots cut in the tube 21 and, in the position of the pin shown in FIG. 1, engages in a groove formed in the pin 20. When the pin 20 is driven into the housing, the force is sufficient to cause the clip to ride up out of the groove in which it is initially engaged and then to snap back into a groove 24 formed adjacent the driven end of the pin 20. This retains the pin 20 within the housing and makes unauthorised retraction of the pin difficult.

The shaft 8 supports a plate 25 which as described below is used to lock the indicator 5. In the position of the key 9 and shaft 8 shown in FIG. 1, the plate 25 is in a position in which it does not obstruct rotation of the indicator 5. Rotation of the shaft 8 through 90° C. to the position shown in FIG. 3 would however enable the plate 25 to engage in slots provided in the indicator as described below. The shaft 8 also supports an indicator plate 26 which adopts the position shown in broken lines in FIG. 1 when the key 9 is turned clockwise, and which would be visible beneath an indicator window 27 (the position of which is shown in broken lines 27 in FIG. 1 and is shown in full in FIG. 2) when the key 9 is rotated in the anti-clockwise direction.

The shaft 6 supports a plate 28 and indicator 29 and can be engaged by a release pin 30 in exactly the same manner as the shaft 8 supports the plate 25 and indicator 26 and interacts with the pin 20. A viewing window 31 is also provided above the shaft 6.

FIGS. 5 to 8 illustrate the structure of the transmission 3 of FIG. 1. The transmission comprises six components, that is a central section 32, an upper section 33 supporting eight upper teeth 34 and nine lower teeth 35, a lower section 36 supporting nine upper teeth 37 and eight lower teeth 38, upper and lower cam members 39 and 40 which are slidably received within the central section 32, and a compression spring 41 which is located within the central section 32 and biases the cam members 39 and 40 apart The cam members 39 and 40 are hexagonal to fit within a hexagonal passage within the central section 32 and each define ramp surfaces 42 which mate with ramp surfaces 43 defined on the upper and lower sections 33 and 36 respectively. Each of the ramp surfaces defines three peaks separated by troughs such that for example components 33 and 39 normally assume one of three relative orientations.

The central section 32 supports a sprocket 44 which engages with the pins 14 (FIG. 1). The sprocket 44 of the central section comprises nine teeth. Generally the central section 32 and the end sections 33 and 36 rotate as a single body. Thus a single rotation of the hub 2 of FIG. 1 drives the thee pins 14 past the transmission, causing the central section 32 to rotate through 120° C. This causes the teeth 34, 35, 37 and 38 to advance through 120° C.

Figures 9, 12:
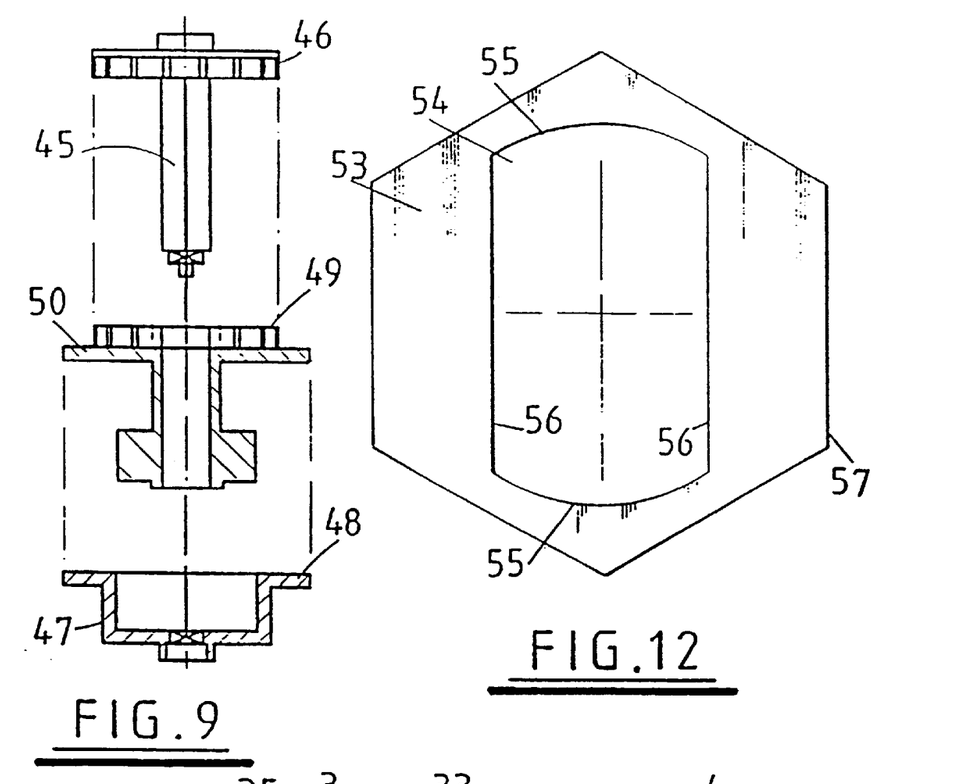
FIG. 9 illustrates component parts of a spindle position indicator shown in FIG. 1.
FIG. 12 is a plan view of a plate which may be used with the arrangement shown in FIG. 1 to interengage a valve spindle and a locking mechanism hub.
Figure 10:
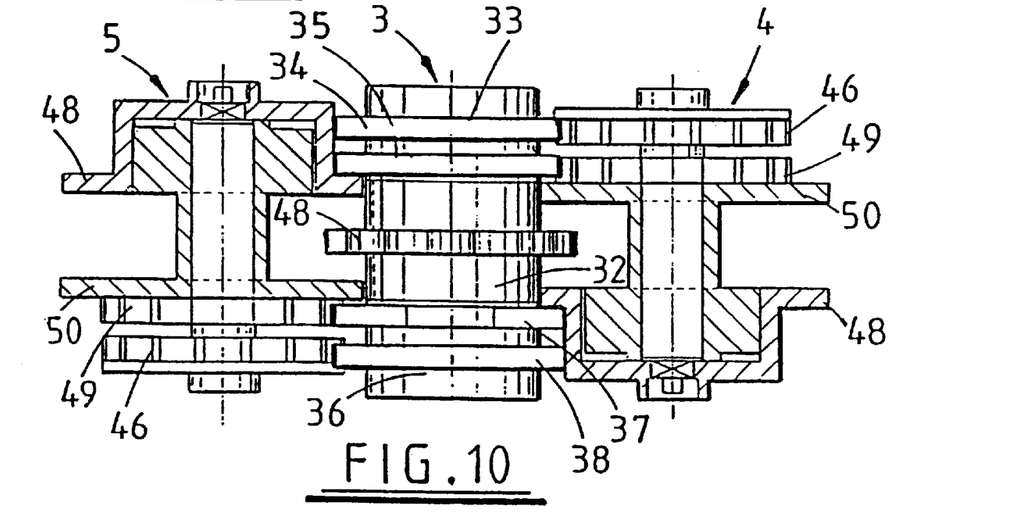
FIG. 10 illustrates the inter-relationship between the spindle position indicator described with reference to FIG. 9 and the transmission described with reference to FIGS. 5 to 8.

The structure of the spindle position indicator 4 is shown in FIG. 9. The structure of the spindle position indicator 5 of FIG. 1 is identical to that illustrated in FIG. 9 except for the fact that the mechanism is inverted. FIG. 10 shows the inter-relationship between the transmission 3 and the position indicators 4 and 5.

Referring to FIG. 9. each of the position indicators comprises a shaft 45 supporting a nine-tooth sprocket 46 which is secured to a member 47 so as to rotate therewith. The member 47 defines a radially extending flange 48. Journalled on the shaft 45 is a central sprocket assembly comprising an eight-tooth sprocket 49 and a radially extending flange 50. In the assembled condition of the spindle position indicator a space is defined between the flanges 48 and 50, that space accommodating the sprocket 44 of the transmission assembly. The space defined between the sprockets 48 and 50 also receives the shaft 6 or 8 of the key actuated assembly.

Figures 11, 13, 14:
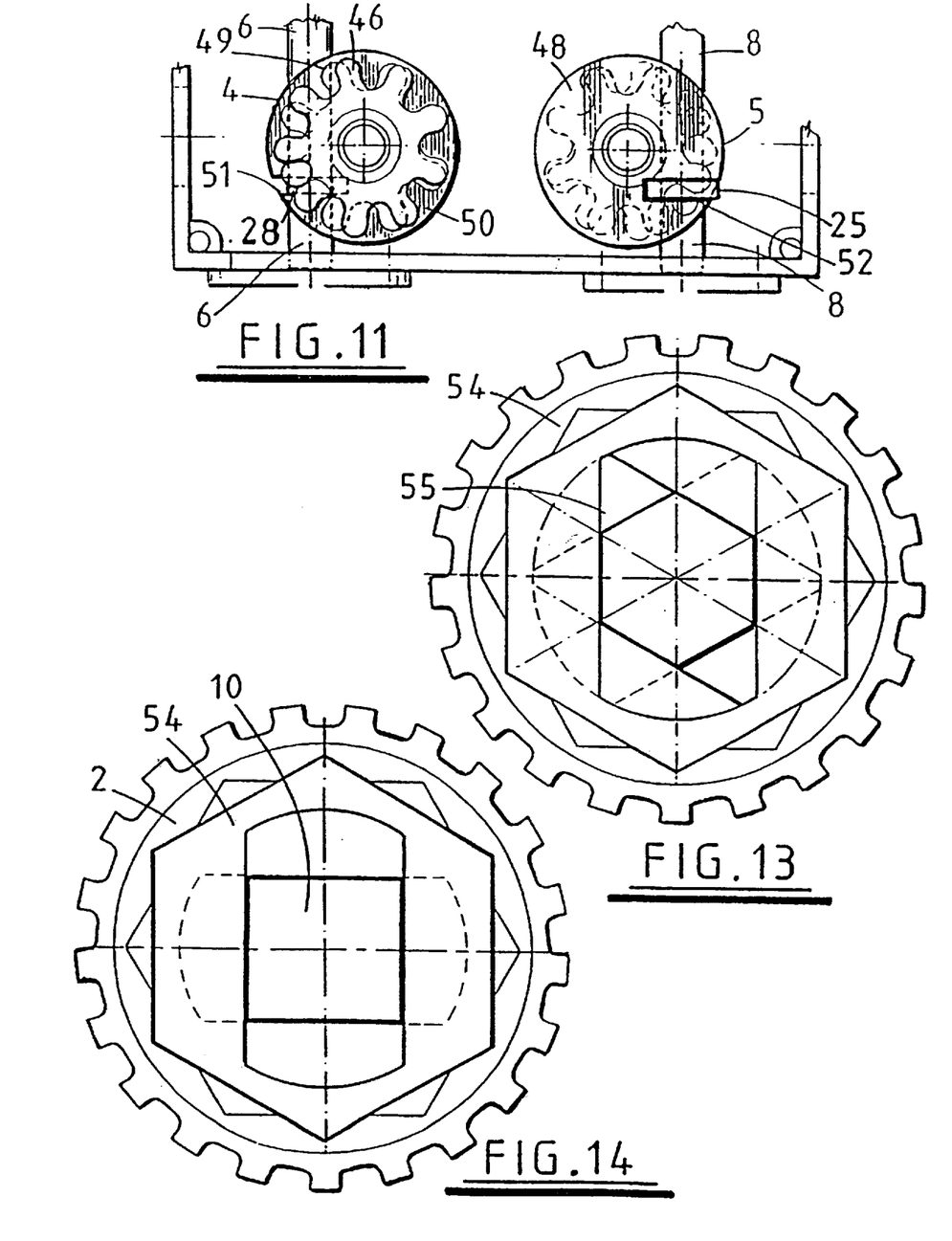
FIG. 11 is a plan view of position indicators shown in FIG. 1 in a predetermined configuration in which associated keys can be actuated.
FIG. 13 shows the use of plates as shown in FIG. 12 to interengage a hexagonal section spindle.
FIG. 14 shows the use of plates as shown in FIG. 12 to interengage a square section spindle and the illustrated embodiment of the invention.

As can best be seen from FIG. 11 which represents a plan view of the two position indicators 4 and 5 of FIG. 1, the flanges 48 and 50 define slots 51 and 52 which in a single pre-determined orientation of the slots 51 and 52 are aligned with the plates 28 and 25 mounted on the shafts 6 and 8. The plates are dimensioned such that when they project perpendicular to the planes defined by the flanges 48 and 50, as illustrated in the case of indicator 4 in FIG. 11, they project into the slots 51 and 52. thereby preventing rotation of flanges 48 and 50 and the sprockets 46 and 49. Rotation of the s through 90° C. would cause the plate 25 to assume the position shown in FIG. 11 in the case of the indicator 5 where the plate 25 is received wholly in the space defined between the flanges 48 and 50. Thus with the plate 25 in the orientation shown for indicator 5 in FIG. 11, the flanges 48 and 50 of indicator 5 are free to rotate. It will be appreciated that whereas in FIG. 11 both of the indicators are shown in a configuration in which they may be locked in position, in practice this would not normally be the case as the indicator 4 could only be locked in position with the valve fully closed and the indicator 5 could only be locked in position with the valve fully open.

The valve lock described with reference to FIGS. 1 to 11 can be readily mounted on a valve so as to enable that valve to be locked in both fully open and fully closed position. The assembly would normally be delivered with both of the indicators 4 and 5 locked, that is with the indicator 4 and 5 in the position shown in FIG. 11 but with the shaft 8 rotated through 90° C. as compared with the position shown in FIG. 11. Once installed, this relative configuration of the two indicators would not occur again. Prior to mounting the assembly on a valve, the valve spindle would be fully closed by turning the spindle as far as possible in a clockwise direction. The housing 1 would then be clamped to the valve body, the hub 2 would be interengaged with the spindle 10 as described in detail below, and the key 7 would be rotated to the position shown in FIG. 1 to enable anti-clockwise rotation of the hub 2.

The hub 2 would then be rotated until the valve was in the fully open position the latch 16 and the teeth 13 operating in the manner of a ratchet and pawl. Rotation of the hub 2 in the anti-clockwise direction drives the transmission 3 which in turn drives the indicator 4. Thus the movements of the components of the indicator 4 track those of the hub 2. The indicator 5 remains locked however and one of the clutch mechanisms in the transmission 3 enables the sprocket 44 to rotate without rotating the indicator 5. Once the valve is fully open, the key 9 can be turned, any subsequent rotation of the hub then being tracked by both indicator 4 and indicator 5.

With the mechanism set as described above, with the keys in the position shown in FIG. 1 the valve can be opened or closed at will. If it is desired to lock the valve in the fully closed position, the spindle is rotated as far as possible in a clockwise direction, thereby returning the left hand indicator 4 to its initial condition in which the shaft 6 can be rotated to lock the flanges 48 and 50 together. Rotation of the shaft also causes the latch 15 to engage, thereby preventing anti-clockwise rotation of the spindle to reopen the valve. Similarly, if it is desired to lock the valve in the open position, this can be achieved by fully opening the valve and then turning the key 9. The keys 7 and 9 are captive except when the associated shaft 6 or 8 has been rotated to engage the respective latch 15 or 16.

The levers 26 and 29 are visible through the windows 27 and 31 and thereby enable a user to readily identify whether or not the shafts 6 and 8 have been rotated to the locked condition. Similarly, one or both of the sprockets 46 and 49 of indicator 4 can carry for example a fluorescent or other visible marker to indicate when the slots 51 and 52 have been aligned to enable rotation of the shaft 6. A marker or markers may also be provided on the flange 48 of indicator 5 for a similar reason. Thus in the event of a user being unable to turn the key when it is believe the valve is in the position in which it should be locked the relative positions of the position indicators 4 and 5 can be easily checked.

It is often the case that after a period of use the seals of a valve become compressed or worn such that whereas initially a pre-set number of rotations of the spindle from a valve fully open position was sufficient to fully close the valve, further turns are now necessary. In such circumstances locking the valve in the position which initially corresponded to the fully closed condition would not ensure that the valve was sealed. The described assembly enables this serious problem to be overcome by allowing the user to reset the "fully locked" spindle position to take account of such valve compression.

If a user fully closes a valve and finds that the key 7 cannot be turned, and confirms that this is because the spindle has been rotated beyond the initial "filly closed" spindle setting, that setting can be adjusted by locking the position indicator 4 when the slots 51 are aligned before the valve is fully closed and then closing the valve fully whilst the latch 16 is in the position shown in FIG. 1. The latch 15 then simply rides over the teeth 13 until the valve has been fully closed. The setting of the position indicator 5 is not disrupted as that position indicator rotates with the hub 2, but the setting of the indicator 4 is effectively reset as necessary. Thus the valve lock is readily reset without requiring any tools and without requiring any operator skill other than a simple appreciation that if the indicator 4 can only be locked before the valve is fully closed, it should be locked in whatever position is possible and then the valve should be fully closed to reset the indicator.

Referring to FIG. 12, this is a simple plan view of a plate 53 which may be used to interengage the hub 2 and spindle 10 of FIG. 1. The plate is in the form of a simple sheet 54 of steel into which a slot 54 has been cut with arcuate end edges 55 and parallel side edges 56. The peripheral edge 57 of the plate is hexagonal and may therefore be positioned in one of twelve positions relative to the hub 2 of FIG. 1. Thus assuming that the housing 1 of FIG. 1 has been mounted on a valve body and the spindle has been rotated to the valve fully closed position as described above in accordance with the standard fitting procedure, the spindle 10 will adopt a rotational position relative to the hub 2 which cannot be accurately predicted. A plate 53 as shown in FIG. 12 in which the edges 56 are spaced by the distance between the opposed faces of the hexagonal spindle shaft may however be placed in the socket defined by the hub 2 in any one of twelve orientations and therefore the hub 2 and spindle 10 may be readily interengaged in a position which at most requires relative rotation between the spindle and the shaft of 1/24 of a full revolution, that is 15°. Subsequent plates can then be dropped in with different orientations such that each of the three pair of faces of the hexagon abut the edges 56 of at least one plate. FIG. 13 shows such an arrangement with the topmost plate 53 being shown in fill lines covered edges of the slots 54 in two lower plates being shown in dotted lines. Thus, providing a sufficiently high stack of plates is inserted into the socket defined by the hub 2, a very secure interconnection can be achieved between the spindle and the hub.

The dimensions of a spindle may not be known in advance. However, a relatively limited range of plates 54 will be sufficient to enable all spindle shapes and sizes to be accommodated. The only variable that would be of relevance would be the spacing between the edges 56. A fitter provide with a stock of plates with a range of sizes in terms of the spacing between the edges 56 would be able to accommodate any hexagonal spindle. Similarly, if other spindle shapes were encountered, for example a square spindle as shown in FIG. 13, the same set of plates 53 with different spacings between the edges 56 can be used to interengage the spindle 10 and the hub 2.

It will be appreciated that although the described embodiment is adapted to lock a valve in a fully opened or a fully closed position, a single latch, transmission and position indicator could be provided to lock a valve in only one of its extreme positions. Furthermore, the illustrated arrangement could be set up to lock a valve in one extreme position and an intermediate position in which for example the valve is half open. This could be achieved by removing the latching mechanism provided for locking in one extreme position, and extending one or both of the slots in the two parts of the associated position indicator mechanism. With such modifications, the device would still enable ready resetting of the extreme position in which the valve can be locked shut.

It will also be appreciated that a further key operated lock mechanism could be provided on the side of the housing remote from the two keys of the illustrated embodiment so as to directly engage the hub. With such an arrangement a supervisor could for example prevent any manipulation of the valve spindle.

It will be appreciated that the housing could incorporate sensing devices capable of generating an electrical signal indicative of the valve lock condition to enable the signalling of that condition to a remote location.

What is claimed is:

1. A valve lock system comprising:

a housing configured to secure to a valve body;

a hub coupled with the housing for rotation relative to the housing about an axis;

a transmission coupled with the hub and operable to rotate with rotation of the hub;

a first spindle position indicator operable to indicate position of the valve spindle based on rotation of the transmission; and a valve spindle adapter system comprising a plurality of adapter plates coupled within the hub and operable to interconnect a valve spindle with the hub wherein the valve spindle and hub can rotate together about the axis.

2. The valve lock system of claim 1, further a second spindle position indicator coupled to the transmission and operable to indicate a position of the valve spindle based on rotation of the transmission.

3. The valve lock system of claim 1, wherein the valve spindle can be locked in a predetermined position.

4. The valve lock system of claim 3, wherein the predetermined position is an open position.

5. The valve lock system of claim 3, wherein the predetermined position is a closed position.

6. The valve lock system of claim 1, comprising a pin operable to override a locking mechanism.

7. The valve lock system of claim 1, further comprising a latch operable to permit the valve spindle to rotate in one direction while preventing rotation in the other direction.

8. A valve spindle adapter assembly comprising a housing which in use is mounted on a valve body from which extends a spindle that is rotatable relative to the valve body about a predetermined axis, a hub mounted on the housing so as to be rotatable about the spindle axis, and mean for inter-engaging the hub and the spindle such that the hub and spindle rotate together, the spindle defining at least one axially extending planar surface, the spindle extending into a socket defined by the hub, and the socket being of uniform non-circular cross-section in planes perpendicular to the spindle axis, wherein the means for inter-engaging the hub and spindle comprises a plurality of plates each defining a peripheral edge which is shaped to fit the socket cross-section in each of a plurality of rotational positions relative to the spindle axis, each plate defining an opening having a straight edge positioned to abut said one planar surface of the spindle.

* * * * *